S. F. DOUGLASS.
VEHICLE RUNNING GEAR.
APPLICATION FILED APR. 19, 1911.
1,068,044.
Patented July 22, 1913.
2 SHEETS—SHEET 1.
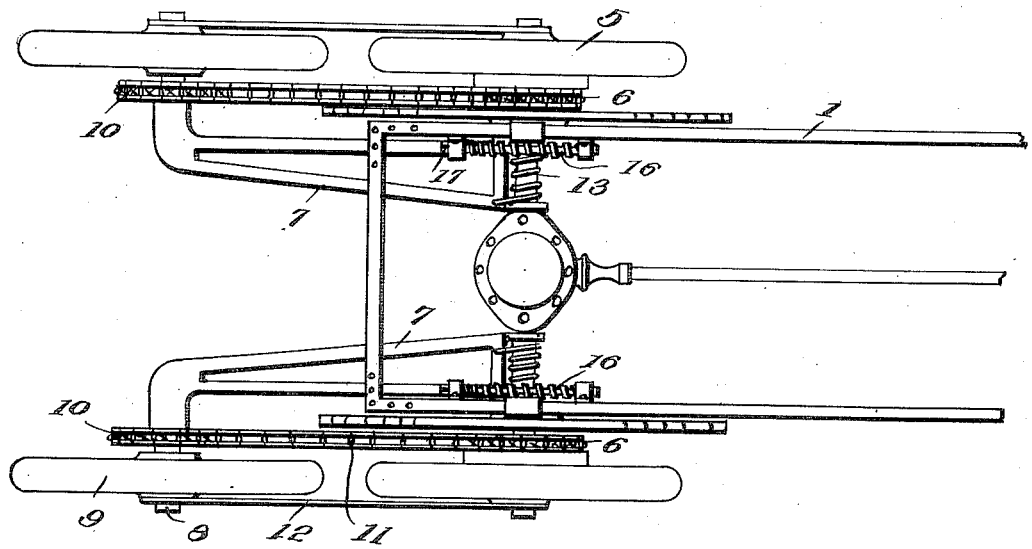
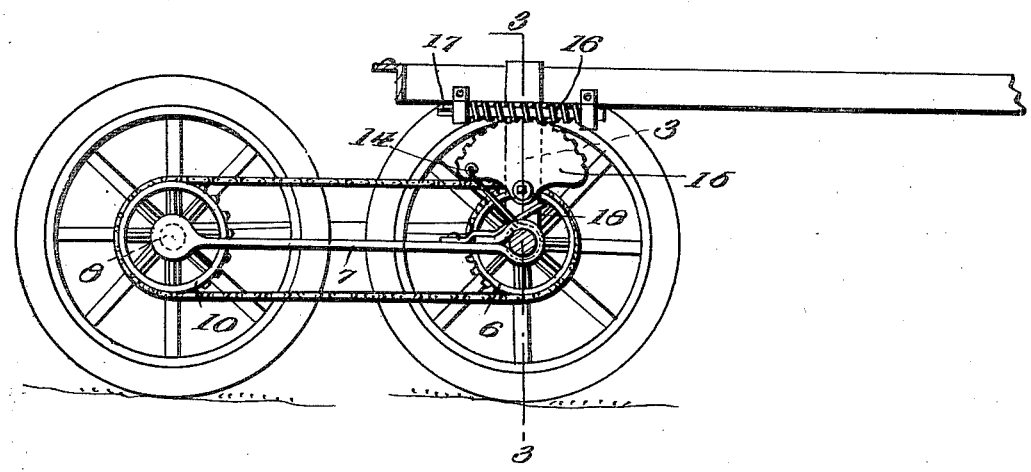
Witnesses
W. N. Woodson
Cora A. Handy
Inventor
S. F. Douglass
By Wm. R. Stacey, Attorneys S. F. DOUGLASS.
VEHICLE RUNNING GEAR.
APPLICATION FILED APR. 19, 1911.
1,068,044.
Patented July 22, 1913.
2 SHEETS—SHEET 2.
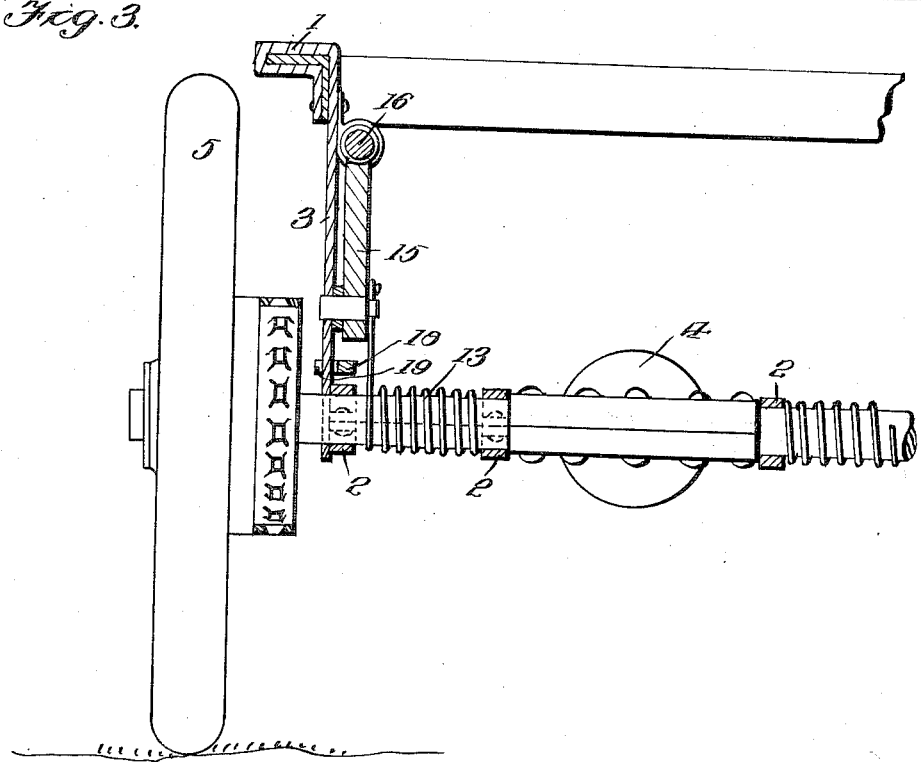
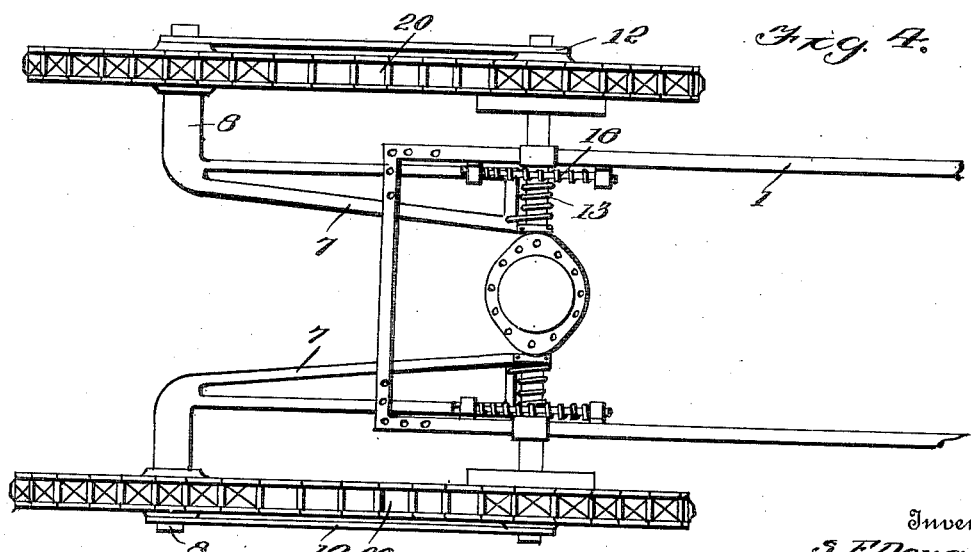
Witnesses
Inventor
S. F. Douglass.
By Stacey, Attorneys

UNITED STATES PATENT OFFICE.

SAMUEL F. DOUGLASS, OF PRAIRIE DU ROCHER, ILLINOIS.

VEHICLE RUNNING-GEAR.

1,068,044. Specification of Letters Patent. Patented July 22, 1913.

Application filed April 19, 1911. Serial No. 622,152.

*To all whom it may concern:*

Be it known that I, SAMUEL F. DOUGLASS, citizen of the United States, residing at Prairie du Rocher, in the county of Randolph and State of Illinois, have invented certain new and useful Improvements in Vehicle Running-Gears, of which the following is a specification.

It is the object of the present invention to provide an improved running gear for motor-driven vehicles, particularly well adapted for embodiment in heavy automobile trucks and motor-driven farm vehicles.

The primary aim of the invention is to secure a wheel-base of greater area than ordinarily provided in such vehicles and to insure of engagement of all of the traction wheels with the surface over which the vehicle is driven.

It is to be contemplated that by the use of the present invention, steep grades and rough and muddy roads may be more readily climbed and traveled than when the ordinary running gear is used.

The invention aims further to secure the above objects without the use of extraordinarily wide wheels and without rendering the running gear clumsy in appearance.

For a full understanding of the invention reference is to be had to the following description and accompanying drawing, in which:—

Figure 1 is a top plan view of the running gear embodying the present invention. Fig. 2 is a vertical longitudinal sectional view therethrough. Fig. 3 is a sectional view on the line 3—3 of Fig. 2. Fig. 4 is a view similar to Fig. 1 showing a slight modification of the invention.

Corresponding and like parts are referred to in the following description and indicated in all the views of the accompanying drawings by the same reference characters.

In the drawings, there is shown a portion of the frame of a motor-driven vehicle and this frame includes side-rails indicated by the numeral 1. An axle 2 is mounted at its ends in depending brackets 3 carried by the side-members 1, and upon the axle at a point midway between its ends is fixed a gear 4 through the medium of which power may be applied to the axle, in the ordinary manner. Traction wheels 5 of any ordinary type are carried at the end of the axle 2, and fixed upon the axle 2 directly inwardly of each wheel 5 is a sprocket gear 6, the purpose of which will be presently explained.

Mounted for vertical swinging movement upon the axle 2 inwardly of each sprocket gear 6 is a frame 7 which extends rearwardly beyond the peripheries of the wheels 5, as clearly shown in the top plan view of the drawings. A stub-axle 8 is provided at the rear end of each frame 7 and mounted upon each stub-axle is a traction wheel 9 also of any ordinary type. Each wheel 9 carries a sprocket gear 10, and a sprocket chain 11 is trained over the gears 6 and 10 at each side of the vehicle. At this point it will be understood that power applied to the axle 2 will be applied not only to the wheels 5 but also to the wheel 9, due to the fact that these wheels are geared with each other at each side of the machine. Therefore, all of the wheels act as traction wheels, and inasmuch as the frames 7 are independently movable, the wheels will follow irregularities in the road surface over which the vehicle is being driven. Brace-bars 12 preferably connect the axles 2 and 8 at each side of the vehicle.

A spring 13 is fitted upon the axle 2 between the portions of each frame 7 connected to the axle and each of these springs has its inner end secured to the respective frame and its outer end secured as at 14 to a segmental worm-gear 15 mounted to rock upon the respective bracket 3. Each bracket also carries a worm-shaft 16 which is in mesh with the respective worm-gear 15, and each of the said shafts 16 has a squared end 17 with which may be engaged a crank-handle (not shown) for the purpose of rotating the shaft. Rotation of the worm-shafts will result in angular adjustment of the segmental worm-gears and in adjustment of the tension of the springs 13.

In order to limit the downward swinging movement of the frames, there is provided upon each of the frames a rearwardly projecting arm 18 having a hooked free end 19 designed to engage with the respective bracket 3 when the frames are swung downwardly by the springs 13, to a predetermined degree.

From the foregoing description of the invention it will be readily understood that the springs 13 serve to hold the auxiliary traction wheels more or less firmly in contact with the surface over which the machine is being driven and that inasmuch as the frames are independently movable, all four of the traction wheels will at all times be in proper contact with the road surface, regardless of irregularities therein. It will furthermore be understood that by the provision of the wheels 9 and by gearing these wheels with those indicated by the numeral 5, a wheel-base of sufficient area is secured to permit of steep grades being readily climbed, and muddy roads readily traveled, which is particularly true where the wheels are provided with anti-skidding tires.

In the form of the invention shown in Fig. 4 of the drawings, the wheels 5 and 9 at each side of the vehicle are geared by a traction-chain 20 which is trained about their peripheries and travels over the road surface.

Having thus described the invention what is claimed as new is:—

1. In running gears, for motor driven vehicles, a frame, bearing brackets upon the frame, a driven axle journaled in the brackets, traction wheels carried by the axle, supports mounted upon the axle for independent up and down swinging movement, springs upon the axle independently holding the supports yieldably swung down, a traction wheel mounted upon each support, gear connection between each of the last mentioned traction wheels and the respective one of the first mentioned traction wheels, and means for limiting the downward swinging movement of the supports comprising an arm fixed to each support and having a hooked end arranged to engage with the respective bearing bracket.

2. In running gear for motor driven vehicles, a frame, bearing brackets upon the frame, a driven axle journaled in the brackets, traction wheels carried by the axle, supports mounted upon the axle for independent up and down swinging movement, a traction wheel mounted upon each support, gear connection between each of the last mentioned traction wheels and the corresponding one of the first mentioned traction wheels, springs arranged upon the axle and connected each at one end with the respective support, a segmental worm gear mounted upon each of the bearing brackets and having connected to it the other end of the respective spring, and a worm-shaft in mesh with each worm gear and rotatable to oscillate the gear and adjust the tension of the respective spring.

3. In running gear for motor driven vehicles, the combination with the driven axle and traction wheels thereon, the ends of the driven axle extending beyond the traction wheels, of supports swingingly mounted upon said driven axle and carrying stub axles, auxiliary traction wheels mounted upon said stub axles and in direct rearward alinement with the first mentioned traction wheels, the free ends of the stub axles extending beyond the auxiliary traction wheels, braces connecting the free ends of the driven shaft with the corresponding free ends of the stub shafts, and gear connection between each of the last mentioned traction wheels and the corresponding one of the first mentioned traction wheels.

In testimony whereof, I affix my signature in presence of two witnesses.

SAMUEL F. DOUGLASS. [L. S.]

Witnesses:
WILLIAM H. KER,
CLARENCE S. DASHNER.